Patented May 27, 1930

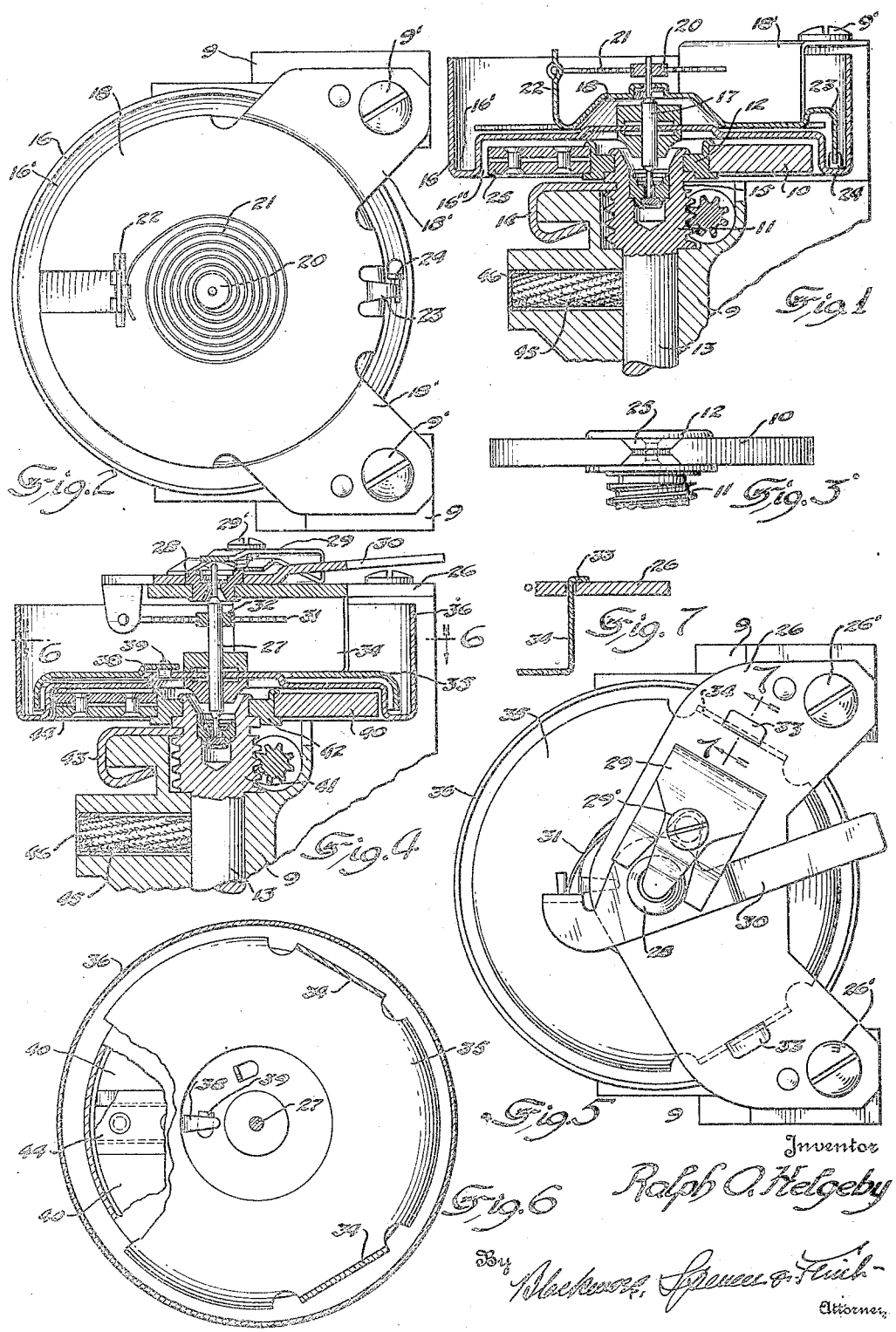

1,760,844

UNITED STATES PATENT OFFICE

RALPH O. HELGEBY, OF FLINT, MICHIGAN, ASSIGNOR TO A C SPARK PLUG COMPANY, OF FLINT, MICHIGAN, A COMPANY OF MICHIGAN

SPEEDOMETER

Application filed June 22, 1928. Serial No. 287,629.

This invention relates to measuring instruments and has been designed as an improvement in a magnetic speedometer employing a rotating magnet.

An object of the invention is to simplify the construction of the speed indicating part of such an instrument. Another object is to make use of a minimum number of parts. Other objects and advantages will be understood from the following description and the accompanying drawing.

In the drawing:

Figure 1 is a vertical central sectional view of the speed unit with parts broken away;

Figure 2 is a top plan view of the mechanism shown in Figure 1;

Figure 3 is a fragmentary side elevation of the magnet showing the thermostatic compensator in place;

Figure 4 is a vertical central sectional view of a modified form;

Figure 5 is a top plan view of the invention shown in Figure 4;

Figure 6 is a sectional view on line 6—6 of Figure 4, parts broken away; and

Figure 7 is a fragmentary sectional view on line 7—7 of Figure 5.

The drawing illustrates only so much of the measuring instrument as is necessary to disclose the invention. The outer casing, the odometer mechanism usually associated with a speedometer, the driving connections and other related parts are not shown.

Referring by reference characters to the drawing and first to Figures 1 to 3, inclusive, numeral 9 designates a die cast frame used to support the speed indicating mechanism and the odometer, not shown. In an opening in frame 9 is rotatably mounted a worm 11. At its upper end this worm carries the hub 12 to which is fixed a magnet 10. The magnet is flat and of annular shape with an opening in the annulus to provide poles.

This worm continues downwardly as a shaft 13 through a suitable bore formed in frame 9. The lower end of shaft 13 is adapted to be connected to and driven by a conventional flexible cable, the flexible cable and the connection between the cable and shaft 13 being omitted since these details do not constitute a part of this invention.

A retaining clip 14 engages a circumferential groove in the worm shaft and is positioned by the frame 9 to hold the worm from axial movement.

Positioned over the magnet and centered in the axis of shaft 13 is a speed cup 16. This speed cup is open at its top, in this respect differing from the prior constructions by being inverted. The cup is carried by a spindle 17, which is journaled at its lower end by suitable bearings located in the upper end of the worm shaft. At its upper end, spindle 17 is journaled by a bearing located in the upper jewel frame 18. The spindle 17 projects through frame 18 and fixed thereto outside the frame 18 is a hub 20, to which is fixed the inner end of a coiled hair spring 21. The other end of hair spring is secured to an up-turned arm 22, which is stamped from jewel frame 18.

Stamped from jewel frame 18 is another arm 23, which is angularly turned in a downward direction into the path of an up-turned ear 24 stamped from the speed cup 16, to act as a stop for limiting the rotation of the speed cup.

It will be seen from Figure 2 that the frame 18 is substantially circular in shape and is positioned within the open speed cup. From the circular portion a plurality of upwardly directed arms 18' extend and the ends of these arms are outwardly bent and secured to the frame 9 by fastening means 9'.

It will also be noted that beyond the periphery of jewel frame 18 the underlying speed cup is depressed to form an annular pocket 16' and a circular recess 16''. It is within this circular recess of the speed cup that the magnet is located. It will therefore be seen that within the axial extent of the speed cup are included the magnet, the hair spring, and substantially the whole of jewel frame 18.

Positioned in the polar gap of the magnet is a temperature compensator 25 of known characteristics, this compensator being preferably in the form of an alloy to correct for variations in magnetic permeability and intended to overcome inaccuracies in speed cup readings, which would otherwise occur with temperature changes. The compensator is preferably formed of two pieces secured together, as shown, and is fixedly positioned by being engaged with the hub 12.

The rotor shaft 13 is lubricated by an oil wick 45 secured in position by a retainer 46.

The construction is very compact, very simple and comprises but few parts which may be economically manufactured and easily assembled.

In Figures 4 to 7 is shown a slightly modified form of the invention. In this form, the die cast frame 9 rotatably carries the shaft 13, as before. Wick 45 and clip 46 provide for lubrication of the rotor shaft. Shaft 13 terminates at its upward end in a worm 41 corresponding to worm 11 and a clip 43 is the counterpart of clip 14. In this modification, a jewel frame 26, shaped as best shown in Figure 5, is secured as at 26' to the frame 9 and overlies the speed cup which is open at its upper end, as in Figure 1. Spindle 27, which carries the speed cup 36, is journaled at its lower end in the worm shaft, and at its upper end to a hole jewel carried by bearing 28 located in the jewel frame 26. The spindle retaining clip 29 is secured to the frame 26 by fastening means 29'. This clip has two arms, one arm retaining the spindle from axial movement, as shown, and the other arm being bifurcated. The furcations of the other arm engage a stamping 30 which constitutes a spring regulator. This second arm of stamping 30 holds the regulator stamping for rotation about bearing 28. The end of arm 30 is attached to the hair spring 31. The other end of the hair spring is secured to a hub 32 carried by the spindle 27.

A circular cap member 35 is positioned within the speed cup 36 closely adjacent the bottom thereof. This member 35 has two upwardly directed legs 34 terminating in ears 33 extending through openings in the frame 26, said ears being oppositely directed whereby they serve to clamp the member 35 in fixed position relatively to the frame 26. An ear 38 is stamped and upset from part 35 to lie in the path of an ear 39 stamped up from the speed cup. The engagement of these parts 38 and 39 serves to limit the rotation of the speed cup.

The speed cup is provided with a circular depression on its outer lower side within which is the annular shaped magnet 40. In this case, as in the other, there is a temperature compensator 44 secured with the magnet to the hub 42 carried by the worm shaft, the compensator being located between the poles of the magnet, as shown in Figure 6.

In both forms of the invention, the speed cup is upwardly open and houses the jewel frame and hair spring. In both, the magnet is received within a depression of the speed cup. In the form shown by Figure 4, adjustability of the hair spring is provided for by the added part 30. In this second form, also, the spindle retainer is adjustable. Both forms of the invention are efficient, simple in construction and easily assembled.

I claim:

1. In a measuring instrument, a rotatable speed indicating cup, an independently rotatable annular magnet influencing the rotation of said cup, said speed cup having a closed bottom provided with a depression, and the rotating magnet being positioned concentric with the cup and in said depression.

2. The invention set forth in claim 1, a rotor shaft carrying said magnet, an upper jewel frame positioned within said speed cup, a spindle mounting said speed cup, bearings for said spindle in the upper end of said rotor shaft and in said jewel frame.

3. In a measuring instrument, a frame, a rotor shaft journaled in said frame, an annular magnet carried by said shaft, a speed cup, a spindle therefor, the speed cup having an outer depression in its bottom wall to house said magnet, a jewel frame within said cup, said spindle journaled axially of said rotor shaft, at one end in said shaft and at its other end in said jewel frame.

4. In a measuring instrument, a rotor shaft, an annular magnet, said magnet carried by said rotor shaft, a speed cup open at its upper end, said speed cup having a depression in the outer face of its bottom wall, the magnet being located in said depression, said speed cup having a spindle, a fixed jewel frame within the cup, the spindle journaled axially of the rotor shaft, within the shaft and in the jewel frame, a hair spring connected at one end of said spindle and within said cup, means associated with said jewel frame to hold the other end of said hair spring.

5. In a measuring instrument, a rotatably mounted speed cup having an annular wall and a closed bottom, an independently rotatable annular magnet within an outer depression of said bottom wall, a jewel frame within said cup, and a hair spring to restore said speed cup to a predetermined position, said hair spring located within said cup.

6. The invention set forth in claim 5, said speed cup having an inner annular recess adjacent its annular wall, co-operating parts on said speed cup and jewel frame within said recess to limit the rotation of the speed cup.

In testimony whereof I affix my signature.

RALPH O. HELGEBY.